INVENTORS.
ALBERT T. CAMP
FRANK G. CRESCENZO

INVENTORS.
ALBERT T. CAMP
FRANK G. CRESCENZO

INVENTORS.
ALBERT T. CAMP
FRANK G. CRESCENZO

ATTORNEYS.

United States Patent Office 3,102,834
Patented Sept. 3, 1963

3,102,834
COMPOSITION COMPRISING NITROCELLULOSE, NITROGLYCERIN AND OXIDES OF LEAD OR COPPER
Albert T. Camp and Frank G. Crescenzo, China Lake, Calif., assignors to the United States of America as represented by the Secretary of the Navy
Filed June 4, 1958, Ser. No. 739,950
4 Claims. (Cl. 149—97)
(Granted under Title 35, U.S. Code (1952), sec. 266)

The invention described herein may be manufactured and used by or for the Government of the United States of America for governmental purposes without the payment of any royalties thereon or therefor.

This invention relates to gas producing charges; more particularly it relates to double base gas generating charges exhibiting very low dependence of burning rate on conditioned temperature.

In many gas generator compositions as opposed to propellants, it is desirable to have relatively low energy compositions which burn relatively slowly and cleanly at a constant rate, in order to produce steady flows of gas. Low energies and slow burning rates are not hard to incorporate into a composition, but a constant burning rate independent of conditioned temperature is.

Gas generators in the past have been characterized by burning rates which were dependent upon conditioned temperature, that is, the temperature of the composition at ignition. As little as 10° F. difference in conditioned temperature made an appreciable difference in the burning rate and hence the rate of flow of gas. Thus, where a gas generator is to be used in aircraft rockets to drive a turbine as a source of power, the old compositions could not reliably produce steady flows of gas because an aircraft carrying such rockets experiences such a wide temperature differential in operating between almost sea level and 60,000 feet.

It is therefore an object of the invention to provide a gas generating composition having a burning rate which is substantially independent of conditioned temperature, and which has the other chemical characteristics desirable in gas generators.

Additional objects are to provide compositions which have good surveillance qualities, are susceptible to being mass produced, are readily reproducible, and which have the physical properties required of gas generator grains.

The aforementioned objects can be accomplished by nitrocellulose-nitroglycerin double base compositions to which have been added, in addition to the usual plasticizers and stabilizers, certain inorganic oxides in order to produce the temperature insensitivity. Lead and copper oxides are the compounds which are critical. They are used in substantially equal amounts in the range of about ½ to 2 percent each, the presence of both being necessary to produce the desired insensitivity. About ½ percent of each is required to produce the result and there is no advantage in usign more than about 2 percent of each.

In addition to the aforementioned oxides, the compositions contain about 40 to 44 percent nitrocellulose, 25–35 percent nitroglycerin, 8–17 percent plasticizer, 1–3 percent stabilizer, 0–10 percent cellulose acetate, 0–3 percent ethyl centralite, and a trace of candelilla wax. Such ranges in ingredients result in compositions having heats of explosion ranging from about 500–800 calories per gram. Suitable plasticizers are triacetin and phthalate, adipate, sebacate, glycol, and glycerol esters, all known in the art and non-explosive. Suitable stabilizers are derivatives of urea; diphenylamine, and aniline, also known in the art.

Nitrocellulose, nitroglycerin and the oxides make a positive contribution to the heat of explosion while the other ingredients make negative contributions. Cellulose acetate and ethyl centralite act as burning rate depressants, the latter serving also as a stabilizer.

The compositions of this invention are made by a slurry process. Nitrocellulose is mixed to a thin slurry with about five to ten times its weight of warm water. Finely ground stabilizer is added and blended by stirring. A solution of nitroglycerin in the plasticizer is slowly added with stirring. Alternatively, the nitroglycerin may be dissolved in methyl alcohol and added to the slurry and the plasticizer added later. Cellulose acetate and ethyl centralite are then stirred in. Candelilla wax is stirred into the slurry in order to improve the extrusion characteristics of the compositions.

The ingredients are all insoluble in water so the slurry process is well adapted to producing the compositions of this application; further, the use of solvents in the manufacture is undesirable. The more finely divided the solid is before addition to the slurry the better, and the more agitation during blending the better, since both factors tend to make the final product more homogeneous. The order of mixing the ingredients is not critical, only homogeneity.

The blended slurry is filtered or centrifuged to remove most of the water. Any methyl alcohol used with the nitroglycerin as aforementioned will be dissolved in this water and thus removed from the composition where it would be objectionable.

The resulting paste is aged from one to five days at about 130° F., and then air dried until the moisture level ranges from 8 to 15 percent. If at any time it becomes desirable to incorporate a water soluble ingredient, it is added to the paste at this point and mechanically blended. The finely divided oxides are thus blended because they do not mix well in the slurry tanks used in producing batches. The compositions are milled to a homogeneous colloid on a heated differential rolling mill. The sheet is then ready for extrusion into any desired grain shape in a warm evacuated extrusion press.

Reference is now made to FIGURES 1–4 of the drawings which form a part of this application. Each figure contains a graph showing plots of various isotherms corresponding to the conditioned temperatures of the compositions on a pressure-burning rate coordinate system. The formulae in weight percent for the various compositions appear on the graphs to which they refer along with heats of explosion in calories per gram.

The heats of explosion of the compositions range between about 500–800 calories per gram as aforementioned, and can be controlled by adjusting the amounts of the ingredients. Said heats of explosion can be calculated by multiplying the heats of explosion and combustion of the pure ingredients, which have been determined many times and are accurately known, by the percentage of each ingredient and summing up the products thus obtained. Heats of explosion of the compositions can also be measured accurately by well-known calorimetric techniques. As can be seen on the graphs, there is very close agreement between calculated and measured values.

The data for the curves of the pressure-burning rate relationship were obtained as follows: Strands of the composition 0.1 inch in diameter and 7.5 inches long were coated with vinyl lacquer and dried. A chromel wire was inserted in one end of each strand normal to its axis for support and 0.5 ampere capacity fuse wires were inserted in drilled holes spaced accurately two inches apart in each strand. The strands were individually connected to appropriate ignition and clock timing circuits and burned cigarette fashion from top to bottom in Crawford type bombs under nitrogen at substantially constant pressures and temperatures. The burning time, the pressure, and the temperature were all recorded. Different data were obtained by changing the pressure inside the bomb, or the temperature of the strand, or both.

Burning rates were calculated from the recorded burning times and the known distance between the drilled holes in the strand. Burning rates thus calculated were plotted on logarithmic paper as a function of the average pressure inside the bomb during burning, the pressure varying but little during burning. The tangent of the angle of the isotherm with the horizontal is the slope of the pressure-burning rate curve plotted on coordinate paper.

It will be seen that the isotherms exhibit a region where the aforementioned slope is negative, that is, the burning rate decreases with increasing pressure within the region. In this respect, the compositions are similar to the "mesa" type propellants disclosed in a copending case, Serial No. 353,312, filed April 30, 1953, by Albert T. Camp, notice of allowability dated February 17, 1955. The negative slopes of the various isotherms on each graph do not always fall within the same regions of pressures as did the isotherms in the copending case, but the isotherms in the instant case do converge in certain regions of pressure as will be pointed out.

Referring to FIG. 1, a substantially constant burning rate of about 0.2 inch per second is obtained in the pressure range of about 600–900 p.s.i. The composition could be used over a wider range of pressures if the added variation in the burning rate could be tolerated.

FIG. 2 shows a composition in which the nitroglycerin, ethyl centralite, and 2-nitrodiphenylamine content has been reduced slightly and the proportion of triacetin has been increased. A slightly lower heat of explosion is obtained than in FIG. 1 and a slightly lower burning rate. The composition is quite useful between the pressures of 500 and 850 p.s.i.

Figure 1:
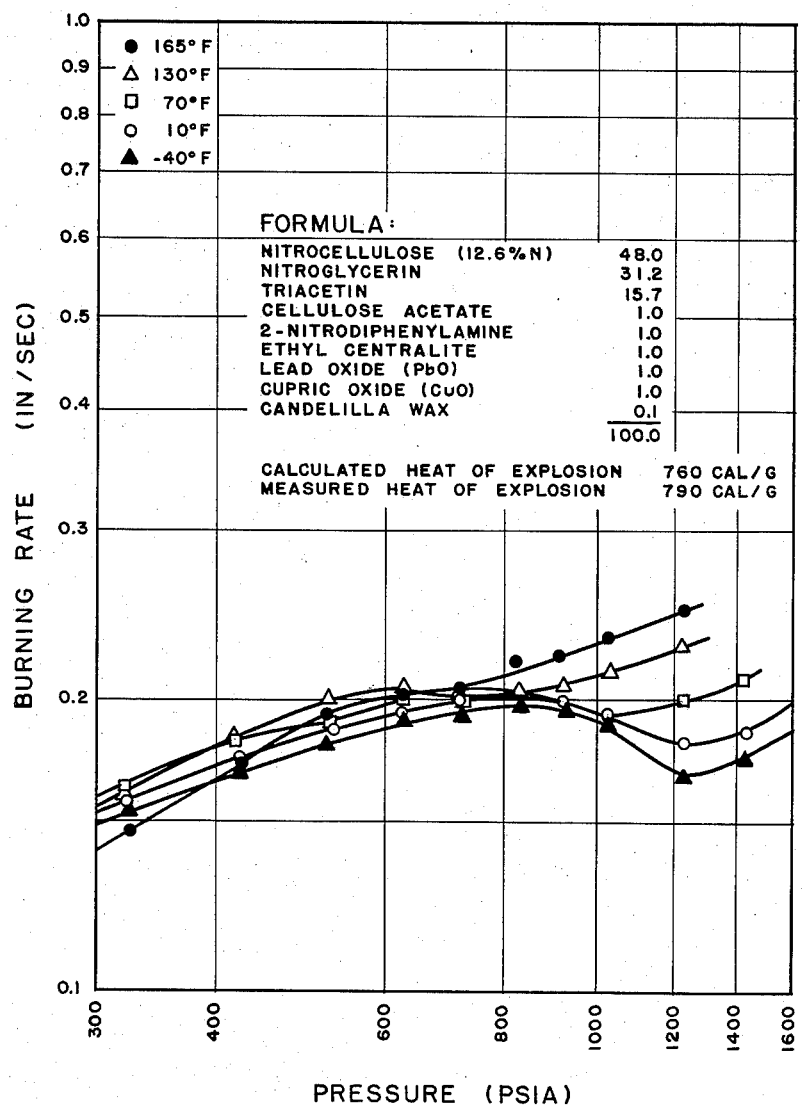
Figure 2:
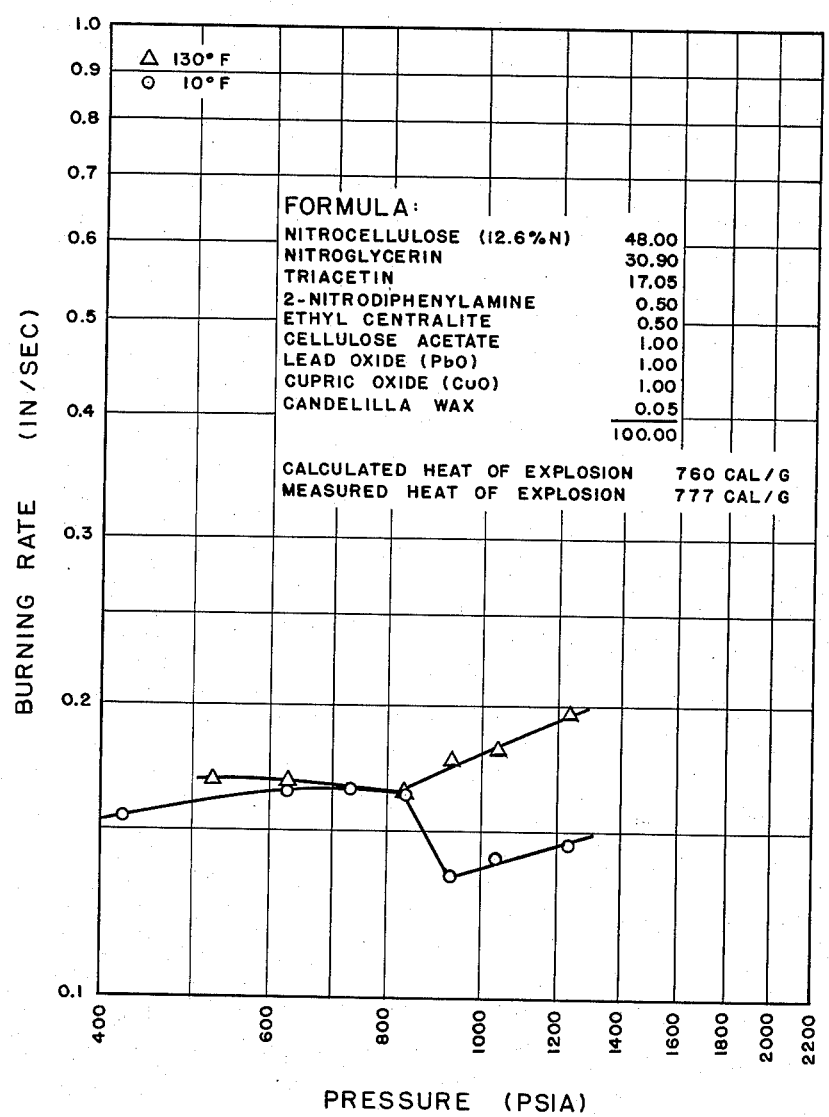
Figure 3:
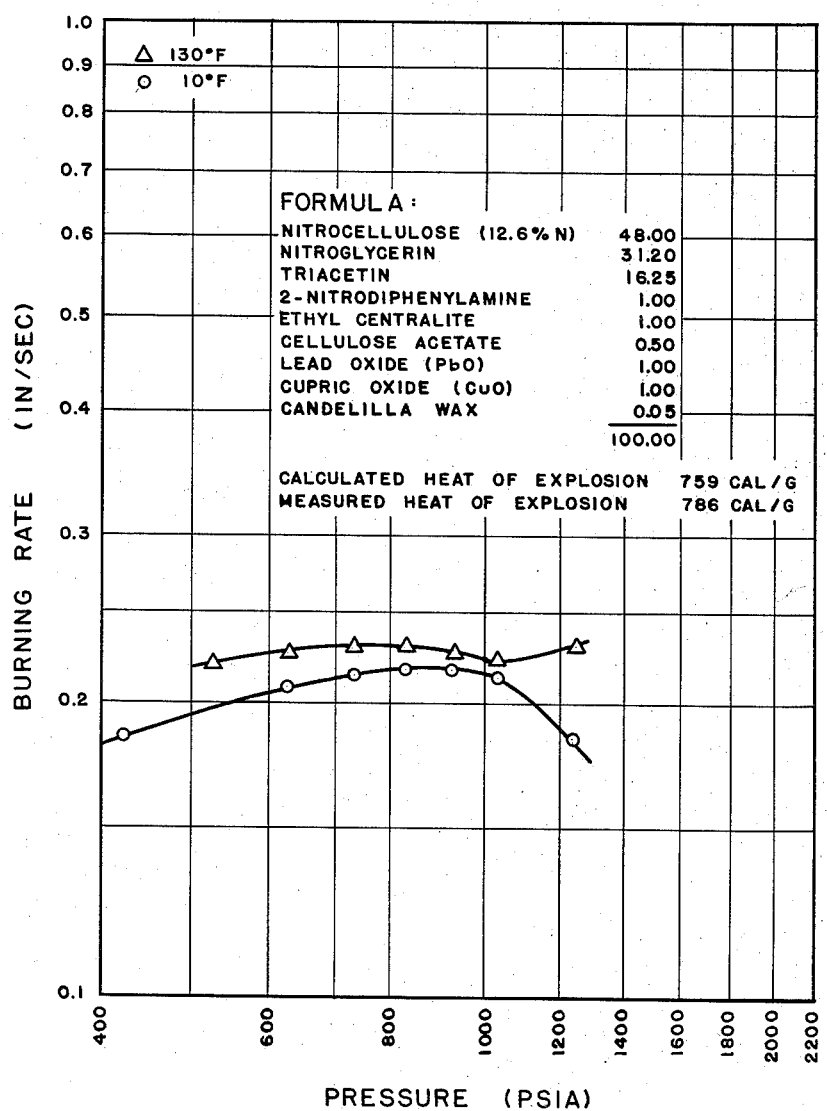
FIG. 3 shows a composition wherein the triacetin has been enriched at the expense of the cellulose acetate and candelilla wax, the other ingredients being present in the same percentages as in the composition of FIG. 1. The energy is only very slightly less than that of FIG. 1 but the burning rate is appreciably higher, about 0.225 inch per second in the pressure range of about 500–1050 p.s.i.
Figure 4:
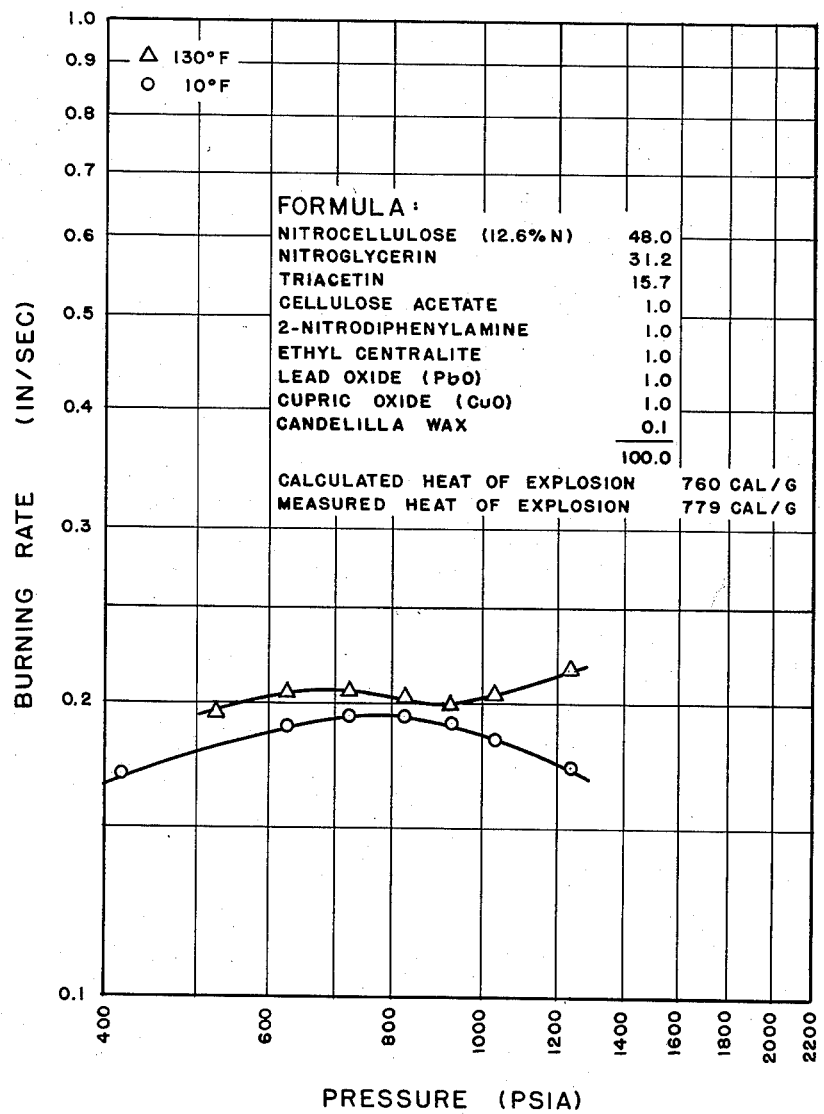
FIG. 4 shows another test on the same composition as shown in FIG. 1. Results are quite similar as is to be expected.

The burning rates at constant pressure can be decreased by adding more inert ingredients to the composition. This can be conveniently done in practice by increasing the content of cellulose acetate at the expense of nitroglycerin or triacetin.

Routine and accelerated aging tests have shown that the compositions are not undesirably affected by storage over long periods of time. The compositions gave good Talliani stability and produced no red fumes or explosion in the 120° C. methyl violet test after five hours. Tensile, shear, and compression tests on grains made of the compositions over a wide range of temperatures showed the composition to be satisfactory with respect to these properties.

It is thus seen that with applicants' compositions, a substantially constant burning rate, regardless of conditioned temperature, is obtained over certain pressure ranges. With proper combustion chamber design, the pressure in the chamber can be kept within the aforementioned pressure range, assuring a steady burning rate of the composition, resulting in a substantially constant flow of gas for the turbine.

The compositions have been thoroughly tested in gas generators to power servo systems in operational missiles and have proved highly effective.

Obviously, many modifications and variations of the present invention are possible in the light of the above teachings. It is therefore to be understood that within the scope of the appended claims the invention may be practiced otherwise than as specifically described.

What is claimed is:

1. A solventless processed gas producing composition consisting essentially of by weight about 40–55 percent of nitrocellulose, about 25–35 percent of nitroglycerin and about 1–4 percent of a mixture of oxides of lead and oxides of copper in which each oxide is present in an amount equal at least to one half of a percent by weight.

2. The composition of claim 1 in which the oxides are present in equal amounts.

3. The composition of claim 1 including about 1–3 percent by weight of a stabilizer from the class consisting of 2-nitrodiphenylamine, diphenylamine and aniline, and about 8–17 percent by weight of a plasticizer from the class consisting of triacetin and phthalate, adipate, sebacate, glycol and glycerol esters.

4. The composition of claim 3 to which has been added by weight up to about 10 percent of cellulose acetate and up to about 3 percent of ethyl centralite.

References Cited in the file of this patent

UNITED STATES PATENTS

| | | |
|---|---|---|
| 2,201,640 | Weldin | May 21, 1940 |
| 2,433,932 | Stosick | Jan. 6, 1948 |
| 2,433,943 | Zwicky et al. | Jan. 6, 1948 |
| 2,587,694 | Chalmers et al. | Mar. 4, 1952 |
| 2,771,351 | Holmes et al. | Nov. 20, 1956 |

OTHER REFERENCES

Bebie: "Manual of Explosives, Military Pyrotechnics, and Chemical Warfare Agents," 1943, pp. 134–135.